United States Patent
Noma et al.

(10) Patent No.: US 11,487,149 B2
(45) Date of Patent: Nov. 1, 2022

(54) CURVED DISPLAY DEVICE

(71) Applicant: SHARP KABUSHIKI KAISHA, Sakai (JP)

(72) Inventors: Mikihiro Noma, Sakai (JP); Kiyoshi Minoura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/323,515

(22) Filed: May 18, 2021

(65) Prior Publication Data

US 2021/0364851 A1 Nov. 25, 2021

(30) Foreign Application Priority Data

May 20, 2020 (JP) .............................. JP2020-088132

(51) Int. Cl.
  *G02F 1/1335* (2006.01)

(52) U.S. Cl.
  CPC .............................. *G02F 1/133528* (2013.01)

(58) Field of Classification Search
  CPC ................................................ G02F 1/136222
  See application file for complete search history.

(56) References Cited

U.S. PATENT DOCUMENTS

| | | | |
|---|---|---|---|
| 2016/0131945 A1 | 5/2016 | Woo | |
| 2016/0291357 A1* | 10/2016 | Min | G02F 1/1334 |
| 2017/0139274 A1* | 5/2017 | Hirota | G02F 1/13338 |
| 2018/0307092 A1* | 10/2018 | Lin | G02F 1/133528 |
| 2019/0196266 A1 | 6/2019 | Woo | |
| 2019/0204642 A1* | 7/2019 | Song | G02F 1/13306 |
| 2019/0324319 A1* | 10/2019 | Park | G02F 1/133528 |
| 2020/0064672 A1* | 2/2020 | Iwasaki | G02F 1/133528 |
| 2020/0142234 A1* | 5/2020 | Iwasaki | G02F 1/133528 |

FOREIGN PATENT DOCUMENTS

JP 2016-95492 A 5/2016

* cited by examiner

*Primary Examiner* — Edmond C Lau
(74) *Attorney, Agent, or Firm* — ScienBiziP, P.C.

(57) ABSTRACT

Provided is a curved display device capable of preventing or reducing local light leakage while achieving a certain contrast ratio. The curved display device includes a liquid crystal panel in a normally black mode. The liquid crystal panel includes a first polarizer, a liquid crystal cell, and a second polarizer in a stated order from a viewing surface side. The liquid crystal cell includes a first substrate including a transparent substrate, a liquid crystal layer, and a second substrate including a transparent substrate in a stated order from the viewing surface side. At least one of the first substrate or the second substrate is provided with a third polarizer on a surface of the transparent substrate closer to the liquid crystal layer.

8 Claims, 7 Drawing Sheets

Polarization axis and retardation caused by glass are shifted from each other to form crossing angle Direction of retardation caused by glass Alignment direction Curving direction Polarization axis and retardation caused by glass are shifted from each other to form crossing angle Direction of retardation caused by glass Curving direction

CURVED DISPLAY DEVICE

CROSS-REFERENCE TO RELATED APPLICATIONS

The present application claims priority under 35 U.S.C. § 119 to Japanese Patent Application No. 2020-088132 filed on May 20, 2020, the contents of which are incorporated herein by reference in their entirety.

BACKGROUND OF THE INVENTION

Field of the Invention

The present invention relates to curved display devices.

Description of Related Art

Liquid crystal display devices have been used in various applications. A technique arising from such a variety of applications is curving the liquid crystal panel, which is a component of liquid crystal display devices, to produce a curved display device (curved display).

For example, JP 2016-95492 A discloses a curved display device including: a first substrate and a second substrate facing each other and having a curvature in at least one portion; a liquid crystal layer arranged between the first substrate and the second substrate; a first polarizing layer arranged between the first substrate and the liquid crystal layer or on the outer surface of the first substrate; and a second polarizing layer arranged between the second substrate and the liquid crystal layer or on the outer surface of the second substrate, wherein at least one of the first polarizing layer or the second polarizing layer is arranged either between the first substrate and the liquid crystal layer or between the second substrate and the liquid crystal layer.

BRIEF SUMMARY OF THE INVENTION

Curved display devices cause light leakage (black unevenness) near the four corners of their panel. Such light leakage is significant particularly in fringe field switching (FFS) mode or in-plane switching (IPS) mode liquid crystal panels. Any good, practical countermeasures to completely eliminate light leakage while maintaining the strength of the panel have not been found. Curving the panel involves curving the laminated glass substrates fixed by a sealing material, which leads to concentration of large stress on the four corners of the panel. As a result, retardation occurs due to the photoelasticity of glass to shift the optical design set by the polarizers, causing light leakage (black unevenness). A practical countermeasure to avoid the influence of the retardation caused by glass is therefore required.

The cause of light leakage is now described in detail with reference to FIGS. 6 and 7. FIG. 6 is a photograph of a black image displayed full screen in a curved display device according to a comparative example, showing an example of light leakage. FIG. 7 is a schematic view showing the direction of retardation caused by the glass substrates near the corner surrounded by the white line in FIG. 6. Described here is the case of curving a normally black liquid crystal panel including two glass substrates filled with liquid crystals in between and paired polarizers attached orthogonal to each other on the respective glass plates. In this case, as shown in FIG. 6, black unevenness due to light leakage occurs near the four corners of the panel.

Light leakage is represented by the following formula (3) using the following formulas (1) and (2). The properties that dominate light leakage are the thickness t of glass substrates, radius of curvature R, and glass properties (photoelastic constant C, Young's modulus E).

$$\sigma = E \cdot t/(2(1-v^2)R) \quad (1)$$

$$\delta = C \cdot t \cdot \sigma \quad (2)$$

$$\text{"Light leakage"} = \sin^2(2(\beta-\alpha)) \cdot \sin^2(\pi\delta/\lambda)$$

$$\approx k \cdot \sin^2(2(\beta-\alpha)) \cdot (C^2 \cdot t^4 \cdot E^2)/R^2 \propto t^4 \quad (3)$$

δ: phase difference (retardation) caused by glass substrates
σ: curvature stress on glass substrates
β: azimuth angle of phase difference caused by glass substrates
α: azimuth angle of transmission axis of polarizer
C: photoelastic constant of glass substrates
t: thickness of glass substrates
E: Young's modulus of glass substrates
R: radius of curvature of glass substrates
v: Poisson's ratio of glass substrates
λ: wavelength of light The curvature stress σ on the glass substrates is represented by the following formula (4).

$$\sigma = \sigma 1 - \sigma 2 \quad (4)$$

σ1: maximum stress applied to glass substrates
σ2: minimum stress applied to glass substrates
The formula (3) is more specifically as follows.

$$\text{"Light leakage"} = \sin^2(2(\beta-\alpha)) \cdot \sin^2(\pi\delta/\lambda)$$

Since with $\pi\delta/\lambda \approx 0$, $\sin^2(\pi\delta/\lambda) \approx (\pi\delta/\lambda)^2 = \delta^2 \cdot (\pi/\lambda)^2$, $$\text{"light leakage"} \approx \sin^2(2(\beta-\alpha)) \cdot \delta^2 \cdot (\pi/\lambda)^2$$

$$= \sin^2(2(\beta-\alpha)) \cdot (C \cdot t^2 \cdot E/(2(1-v^2)R))^2 \cdot (\pi/\lambda)^2.$$

If $k = (\pi/2\lambda)^2$, since $1 - v^2 \approx 1$, $$\text{"light leakage"} \approx k \cdot \sin^2(2(\beta-\alpha)) \cdot (C^2 \cdot t^4 \cdot E^2)/R^2 \propto t^4.$$

As shown in FIG. 7, the direction of retardation caused by the glass substrates in the central portion of the panel is orthogonal to the transmission axis of one of paired polarizers, which is not a problem. However, since the two glass substrates are fixed by a sealing material, the direction of stress on (direction of retardation caused by) the glass substrates near the four corners is shifted from the direction orthogonal to the transmission axis of one of the paired polarizers, causing light leakage.

In terms of the occurrence of light leakage, i.e., when all of α, β, C, E, and R are constant values, the intensity of light leakage depends only on the thickness t of the glass substrates and is proportional to the thickness t of the glass substrates to the fourth power. Thus, the intensity of light leakage is highly dependent on the thickness t of the glass substrates. A typical method to reduce light leakage is to reduce the thickness t of the glass substrates by a technique such as glass etching. Since this naturally reduces the thickness t of the glass substrates, the rigidity of the glass substrates decreases. The above method therefore serves as an optical countermeasure to light leakage but brings a strength-related issue, meaning that there is a trade-off between these issues.

FIG. 8 is a photograph of a black image displayed full screen in a curved display device according to another comparative example, showing an example of light leakage. As shown in FIG. 8, even when the curving direction of the curved display device is changed, black unevenness due to light leakage occurs near the four corners of the panel as in the case shown in FIG. 7. Black unevenness occurs at the same positions in the glass substrates curved concavely or convexly as seen by the viewer.

Next, the optical mechanism of light leakage is described in detail with reference to FIGS. 9 and 10. FIG. 9 is a schematic exploded perspective view of a display device according to a comparative embodiment including a flat liquid crystal panel, showing the polarization states of light in the display device. FIG. 10 is a schematic exploded perspective view of a display device according to another comparative embodiment including a curved liquid crystal panel, showing the polarization states of light in the display device.

As shown in FIG. 9, when the liquid crystal panel is a common flat panel, the polarization axis of light emitted from the backlight and passed through a polarizer 112 on the back surface side remains the same after passing through a glass substrate 131 on the back surface side. The light is therefore incident on liquid crystal molecules 140 parallelly to the liquid crystal molecules 140 in the no-voltage-applied state. In this state, the angle of the polarization axis does not change when the light passes through the liquid crystal molecules 140, so that the light passes through a glass substrate 121 on the viewing surface side and is then substantially 100% blocked by a polarizer 111 on the viewing surface side.

However, since curving glass causes retardation in the glass, as shown in FIG. 10, when the liquid crystal panel is a curved one, the polarization axis of light having passed through a polarizer 212 on the back surface side slightly rotates when the light passes through a glass substrate 231 on the back surface side to which compressive stress (or tensile stress) is applied. The light is therefore incident on liquid crystal molecules 240 at an angle in the no-voltage-applied state. The polarization axis thereby further rotates when the light passes through the liquid crystal molecules 240, and the polarization axis rotates again when the light passes through a glass substrate 221 on the viewing surface side to which tensile stress (or compressive stress) is applied. As a result, the light passes through a polarizer 211 on the viewing surface side to leak therefrom without being 100% blocked by the polarizer 211. Thus, light leakage is observed.

JP 2016-95492 A suggests provision of at least one polarizer in the inside of glass. Two polarizers are used. The polarizers, however, may not achieve a sufficient contrast ratio unless they are ideal ones. The polarizers used are of two types, namely a reflective polarizer and an absorptive polarizer. The reflective polarizer is a wire-grid polarizer, which is a metal and conductive, and therefore serves as a shield. Thus, it is incompatible with the in-cell liquid crystal. As for the absorptive polarizer, the actual production method is not described, and thus it is difficult to produce an absorptive polarizer in practice. Also, the above document does not mention the thickness of the glass.

The above document is also silent as to a specific technique and a specific structure for production of an in-cell polarizer suitable for the in-cell liquid crystal panel with a touch panel (TP) function on the surface closer to the TFT substrate including thin-film transistors (hereinafter, TFTs).

In response to the above issues, the present invention aims to provide a curved display device capable of preventing or reducing local light leakage while achieving a certain contrast ratio.

(1) One embodiment of the present invention is directed to a curved display device including a liquid crystal panel in a normally black mode, the liquid crystal panel including a first polarizer, a liquid crystal cell, and a second polarizer in a stated order from a viewing surface side, the liquid crystal cell including a first substrate including a transparent substrate, a liquid crystal layer, and a second substrate including a transparent substrate in a stated order from the viewing surface side, at least one of the first substrate or the second substrate being provided with a third polarizer on a surface of the transparent substrate closer to the liquid crystal layer.

(2) In an embodiment of the present invention, the curved display device includes the structure (1), and the third polarizer is provided in one of the first substrate and the second substrate.

(3) In an embodiment of the present invention, the curved display device includes the structure (2), and one of the first substrate and the second substrate in which the third polarizer is not provided is a thin-film transistor substrate including a color filter.

(4) In an embodiment of the present invention, the curved display device includes the structure (2) or (3), the transparent substrate of one of the first substrate and the second substrate in which the third polarizer is provided has a thickness of 0.4 mm or more, and the transparent substrate of the other of the first substrate and the second substrate in which the third polarizer is not provided has a thickness of 0.2 mm or less.

(5) In an embodiment of the present invention, the curved display device includes the structure (4), and the transparent substrate having a thickness of 0.4 mm or more is arranged on the viewing surface side.

(6) In an embodiment of the present invention, the curved display device includes the structure (1), (2), (3), (4), or (5), and the third polarizer contains lyotropic liquid crystals.

(7) In an embodiment of the present invention, the curved display device includes the structure (1), (2), (3), (4), or (5), and the third polarizer contains guest host liquid crystals.

The present invention can provide a curved display device capable of preventing or reducing local light leakage while achieving a certain contrast ratio.

DETAILED DESCRIPTION OF THE INVENTION

Definition of Terms

Herein, the term "viewing surface side" means a side closer to the screen (display surface) of the display device, and the term "back surface side" means a side farther from the screen (display surface) of the display device.

Herein, the expression "X to Y" (where X and Y are each any number) means X or more and Y or less.

Hereinafter, embodiments of the present invention are described. The present invention is not limited to the following embodiments, and the design of the present invention can be modified as appropriate within the range satisfying the configuration of the present invention.

Embodiment 1

Figure 1:
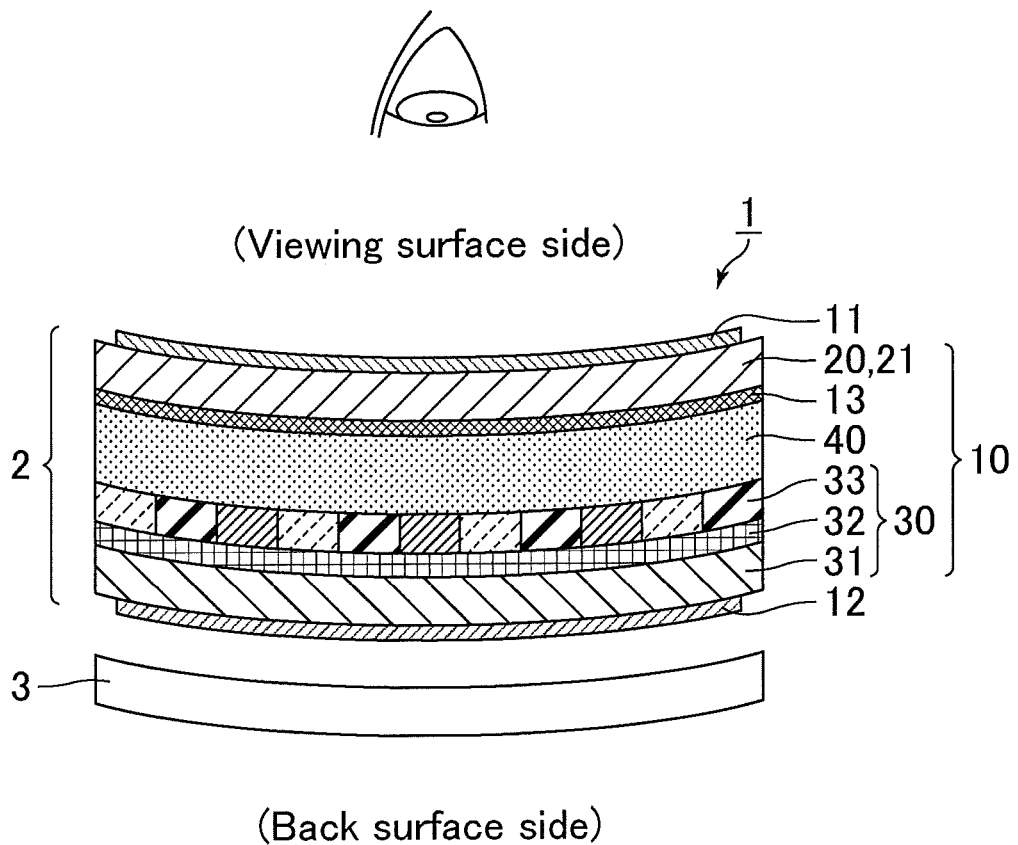
FIG. 1 is a schematic cross-sectional view showing the structure of a curved display device of Embodiment 1.

FIG. 1 is a schematic cross-sectional view showing the structure of a curved display device of Embodiment 1. As shown in FIG. 1, a curved display device 1 of the present embodiment includes a liquid crystal panel 2 in a normally black mode and a backlight 3 provided on the back surface side of the liquid crystal panel 2.

The curved display device 1 has an at least partly (preferably entirely) curved display region on which an image is displayed. At least part (preferably the entire) of the screen of the curved display device 1 has a curvature. The curved display device 1 is producible by fixing the liquid crystal panel 2 in a flat state to the backlight 3 having a curvature with fasteners and thereby curving the panel. The curved display device 1 described here is curved concavely toward the viewer. The liquid crystal display device 1 may also be curved convexly toward the viewer. The curved display device 1 is usually curved such that the left and right ends of the screen approach each other (with the vertical direction of the screen as an axis). The curved display device 1 may also be curved such that the top and bottom ends of the screen approach each other (with the horizontal direction of the screen as an axis).

The liquid crystal panel 2 in a normally black mode has a minimum light transmittance (in a black display state) with no voltage applied to the later-described liquid crystal layer 40 and the light transmittance increases according to the voltage applied to the liquid crystal layer 40.

The liquid crystal panel 2 includes a first polarizer 11, a liquid crystal cell 10, and a second polarizer 12 in the stated order from the viewing surface side.

Examples of the first polarizer 11 and the second polarizer 12 include absorptive polarizers, more specifically those obtained by dying a polyvinyl alcohol film with an anisotropic material such as an iodine complex (or dye) to adsorb the anisotropic material on the polyvinyl alcohol film, and stretching the film for alignment. Herein, the polarizers refer to linear polarizers (preferably, absorptive polarizers), and are distinguished from circular polarizers.

Preferably, the transmission axis (polarization axis) of the first polarizer 11 is orthogonal to the transmission axis (polarization axis) of the second polarizer 12. This means that the first polarizer 11 and the second polarizer 12 are arranged in crossed Nicols. Thus, the liquid crystal panel 2, when it is an FFS mode or IPS mode liquid crystal panel, for example, efficiently achieves the black display state with no voltage applied to the liquid crystal layer 40 and a grayscale display state (e.g., intermediate display state, white display state) with voltage applied to the liquid crystal layer 40. Herein, the expression that two axes and/or directions are "orthogonal" means that the angle between them is 88° to 92°, particularly preferably at 90° (perfectly orthogonal).

The liquid crystal cell 10 includes a first substrate 20 including a glass substrate 21 as a transparent substrate, a liquid crystal layer 40, and a second substrate 30 including a glass substrate 31 as a transparent substrate in the stated order from the viewing surface side. The liquid crystal layer 40 is sandwiched between the first substrate 20 and the second substrate 30 facing each other. The liquid crystal cell 10 further includes a sealing material provided in the periphery of the liquid crystal layer 40. The sealing material bonds the outer edges of the first substrate 20 and the second substrate 30.

The transparent substrates of the first substrate 20 and the second substrate 30 each are an insulating substrate at least part of which (preferably, the entire of which) has a curvature correspondingly to the screen of the curved display device 1.

The first substrate 20 is further provided with a third polarizer 13 on the surface of the glass substrate 21 closer to the liquid crystal layer 40, and a first alignment film on the surface of the third polarizer 13 closer to the liquid crystal layer 40.

The second substrate 30 further includes a TFT layer 32 on the surface of the glass substrate 31 closer to the liquid crystal layer 40, a color filter layer 33 on the surface of the TFT layer 32 closer to the liquid crystal layer 40, an electrode layer on the surface of the color filter layer 33 closer to the liquid crystal layer 40, and a second alignment film on the surface of the electrode layer closer to the liquid crystal layer 40.

The TFT layer 32 includes parallel source lines, parallel gate lines intersecting the source lines, and TFTs serving as switching elements in the respective subpixels. The electrode layer includes pixel electrodes (signal electrodes) in the respective subpixels, and a common electrode (counter electrode) common to all of the pixels. Each subpixel corresponds to a region surrounded by adjacent two source lines and adjacent two gate lines. Each TFT is connected to a corresponding gate line and a corresponding source line. The TFT is a three-terminal switch containing a gate electrode connected to a corresponding gate line, a source electrode connected to a corresponding source line, a drain electrode connected to a corresponding pixel electrode, and a thin-film semiconductor. The pixel electrode is connected to the source line through a thin-film semiconductor.

The color filter layer 33 includes color filters and a black matrix. The color filters include filters of three or more colors, such as red filters, green filters, and blue filters, arranged in a plane in corresponding subpixels. The filters of the respective colors are partitioned by the black matrix provided in the boundaries between the subpixels.

Figure 2:
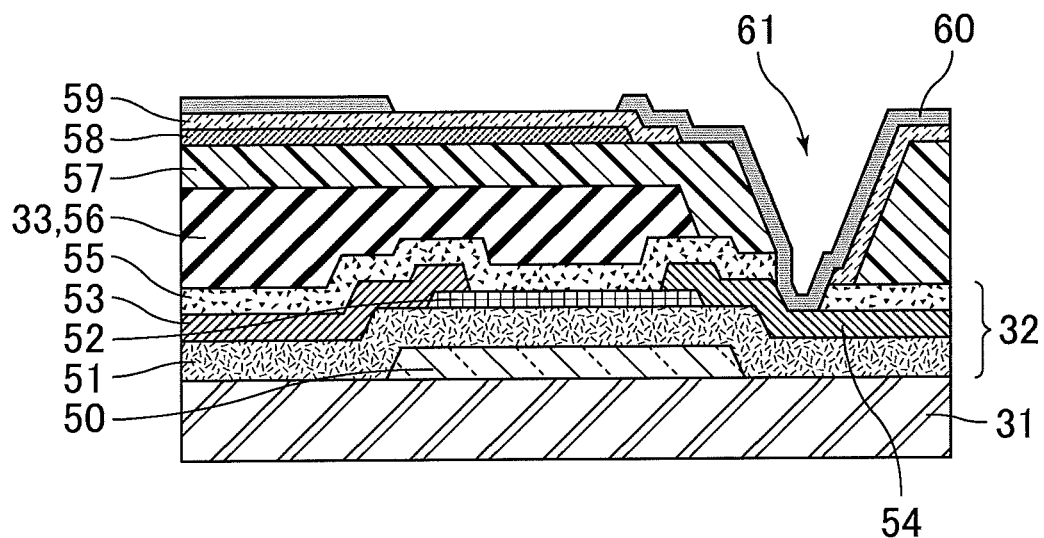
FIG. 2 is a schematic cross-sectional view showing the structure of a second substrate in the curved display device of Embodiment 1.

FIG. 2 is a schematic cross-sectional view showing the structure of a second substrate in the curved display device of Embodiment 1. As shown in FIG. 2, the TFT layer 32 includes a gate layer including gate lines and gate electrodes 50, a gate insulator 51 covering the gate layer, thin-film semiconductors 52 on the gate insulator 51, a source layer including source lines, source electrodes 53, and drain electrodes 54, and a transparent first interlayer insulating film 55 covering the source layer in the stated order from the side closer to the glass substrate 31. On the first interlayer insulating film 55 are provided a color filter layer 33 including color filters 56, and a flattening film 57 formed from a transparent insulating resin and covering the color filter layer 33. The liquid crystal panel 2, when it is an FFS mode liquid crystal panel, includes on the flattening film 57 a common electrode 58 serving as an electrode layer and provided in a plane shape in substantially the entire display region, a second interlayer insulating film 59 which is transparent and covers the common electrode 58, and pixel electrodes 60 provided with slits, in the stated order from the side closer to the glass substrate 31. The pixel electrodes 60 are connected to the respective drain electrodes 54 in the TFT layer 32 through respective contact holes 61.

The pixel electrodes and the common electrode may be stacked in this order from the side closer to the glass substrate 31. In this case, the pixel electrodes are each formed as a plane electrode without a slit, while the common electrode is provided with slits in the regions corresponding to the respective subpixels.

When the liquid crystal panel 2 is an IPS mode liquid crystal panel, the pixel electrodes and the common electrode are each a comb electrode and are arranged such that the comb teeth of the pixel electrodes and the comb teeth of the common electrode fit each other with a space in between. Also, in this case, the pixel electrodes and the common electrode are usually provided in the same layer or in layers adjacent to each other with the second interlayer insulating film in between.

The liquid crystal material in the liquid crystal layer 40 may be a positive liquid crystal material having a positive anisotropy of dielectric constant or a negative liquid crystal material having a negative anisotropy of dielectric constant. For example, when the liquid crystal panel 2 is an IPS mode or FFS mode liquid crystal panel, the liquid crystal molecules in the liquid crystal layer 40 are horizontally aligned in a predetermined direction parallel to the transmission axis of the first polarizer 11 or the second polarizer 12 by the control force of the first and second alignment films with no voltage applied to the liquid crystal layer 40. Herein, the expression that the two axes and/or directions are "parallel" means that the angle between them is −2° to +2°, particularly preferably 0° (perfectly parallel). The liquid crystal molecules in the liquid crystal layer 40 are rotated in the in-plane direction by the transverse electric fields generated in the liquid crystal layer 40 with voltage applied to the liquid crystal layer 40. Hereinafter, a liquid crystal layer in an IPS mode or FFS mode liquid crystal panel is also referred to as an IPS liquid crystal layer.

The second substrate 30 further includes a source driver connected to the source lines, a gate driver connected to the gate lines, and a controller connected to these drivers. The gate driver sequentially supplies scanning signals to the gate lines based on the control by the controller. The source driver supplies data signals to the source lines based on the control by the controller when the corresponding TFTs are triggered to be in the voltage applied state by the scanning signals. The pixel electrodes are each set to have an electrical potential corresponding to the data signal supplied through the corresponding TFT, such that transverse electric fields (fringe electric fields particularly in the FFS mode) are generated between the pixel electrodes and the common electrode to rotate the liquid crystal molecules in the liquid crystal layer 40. The panel thereby controls the magnitude of voltage to be applied between the pixel electrodes and the common electrode to change the retardation in the liquid crystal layer 40, thereby controlling transmission and blocking of light.

One of the first substrate 20 or the second substrate 30, which is the first substrate 20 here, includes a third polarizer (in-cell polarizer) 13 on the surface of the glass substrate 21 closer to the liquid crystal layer 40. This enables control of local light leakage due to the curved glass.

Figure 3:
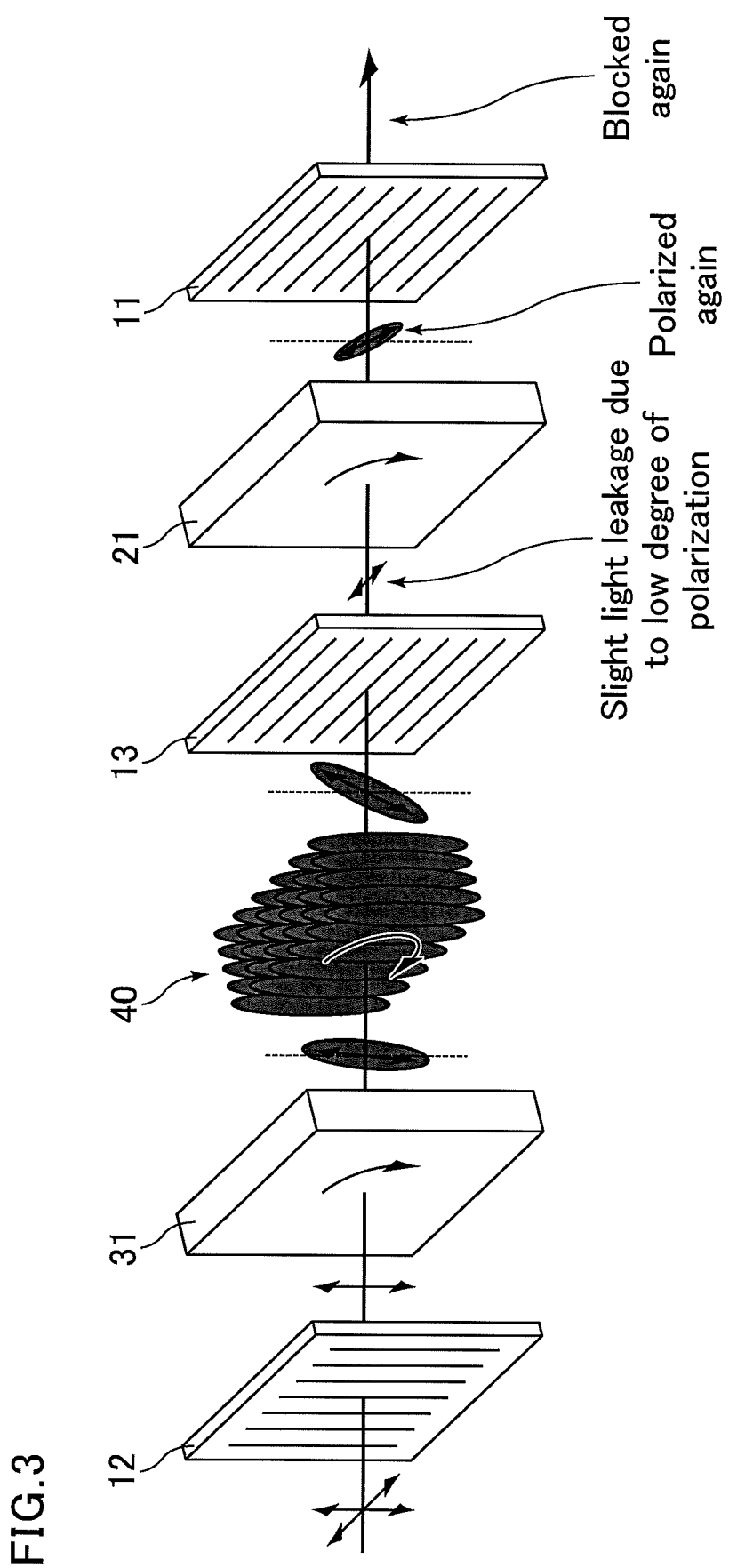
FIG. 3 is a schematic exploded perspective view of the curved display device of Embodiment 1, showing the polarization states of light in the display device.

The difference in effect between a curved liquid crystal panel with one in-cell third polarizer 13 and a curved liquid crystal panel without the third polarizer 13 is described with reference to FIGS. 3 and 10. FIG. 3 is a schematic exploded perspective view of the curved display device of Embodiment 1, showing the polarization states of light in the display device.

Figure 10:
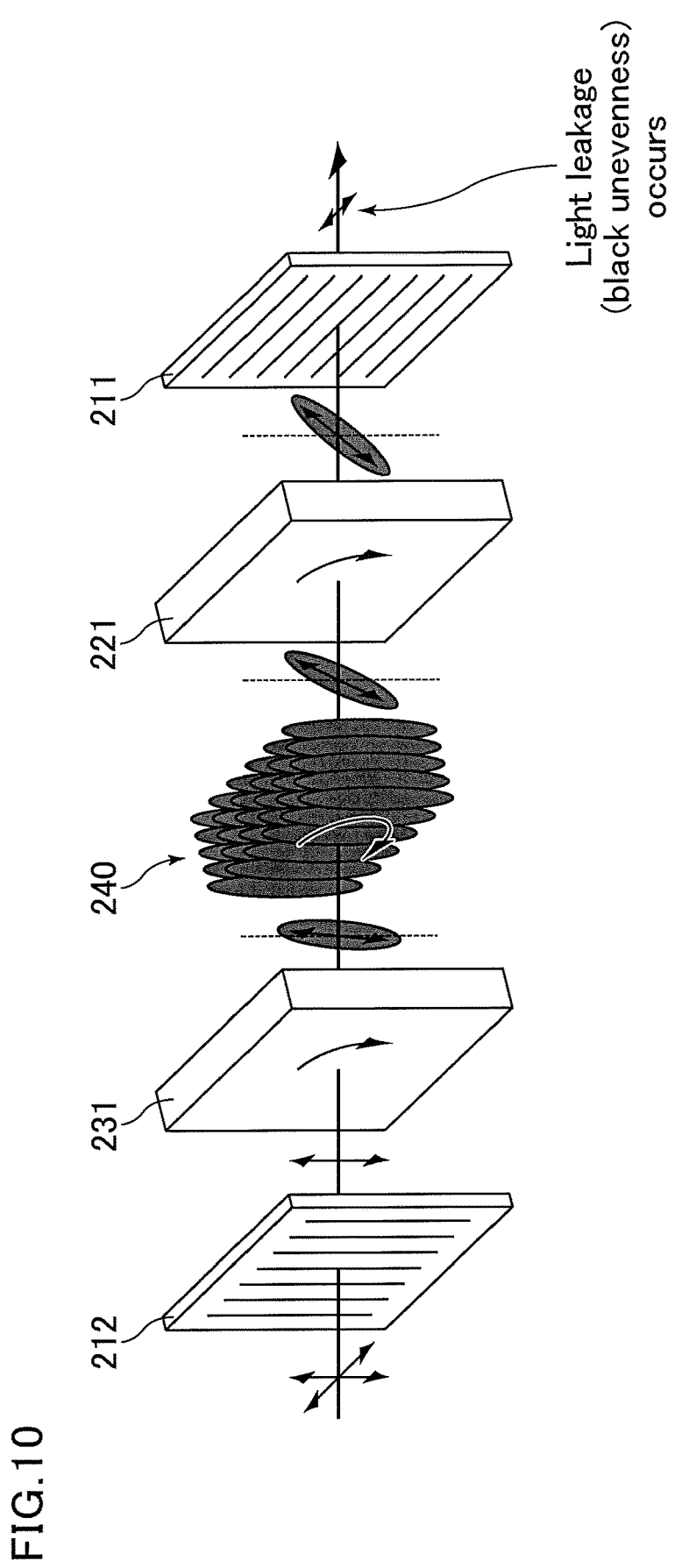
FIG. 10 is a schematic exploded perspective view of a display device according to another comparative embodiment including a curved liquid crystal panel, showing the polarization states of light in the display device.

As shown in FIG. 10, without the third polarizer 13, the linearly polarized light emitted from the backlight and incident on the polarizer 212 on the back surface side is significantly polarized as it passes through the three curved layers, namely the glass substrate 231 on the back surface side, the liquid crystal layer 240 (for example, IPS liquid crystal layer), and the glass substrate 221 on the viewing surface side. The light is therefore not sufficiently blocked by the polarizer 211 on the viewing surface side. Thus, the light passes through the polarizer 211 and appears as light leakage. Here, being "polarized" means that the polarization state of light changes from linear polarization to elliptical polarization or further to circular polarization due to the retardation caused by an optically anisotropic medium or the retardation caused by curving an optically isotropic medium.

In contrast, as shown in FIG. 3, with the third polarizer 13 on the surface, which is closer to the liquid crystal layer 40, of the glass substrate 21 on the viewing surface side, the incident light is significantly polarized through the liquid crystal layer 40 (for example, IPS liquid crystal layer). Then, the polarized light rays orthogonal to the transmission axis of the second polarizer 12 are blocked by the third polarizer 13, and a few polarized light rays passing through the third polarizer 13 are blocked by the first polarizer 11 on the viewing surface side. This results in almost no light leakage.

Thus, the combination use of the third polarizer 13 provided between the glass substrates 21 and 31 and the pair of polarizers 11 and 12 provided on the outer surfaces of the respective glass substrates for achieving a certain contrast ratio of the whole panel is effective to prevent light leakage near the four corners of the panel.

Preferably, the transmission axis of the third polarizer 13 is parallel to the transmission axis of the first polarizer 11 or the second polarizer 12 (here, the first polarizer 11) provided in the same substrate (here, the first substrate 20).

Figure 4:
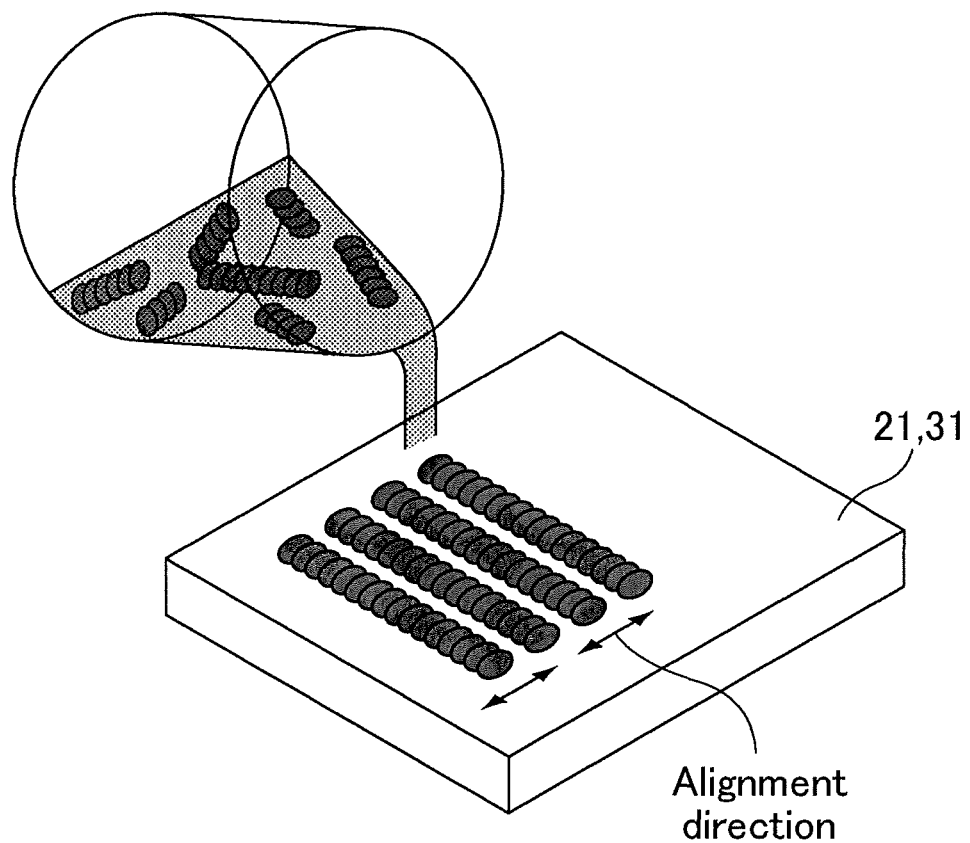
FIG. 4 is a schematic perspective view showing the method of producing a third polarizer on a transparent substrate using lyotropic liquid crystals.

Next, the method of producing the third polarizer 13 on transparent substrates such as the glass substrates 21 and 31 using lyotropic liquid crystals is described with reference to FIG. 4. FIG. 4 is a schematic perspective view showing the method of producing a third polarizer on a transparent substrate using lyotropic liquid crystals. As shown in FIG. 4, transparent substrates (glass substrates 21 and 31) are coated with a liquid crystalline coating liquid containing a lyotropic liquid crystal compound by casting to a certain thickness with a coating device capable of applying shear stress, such as a bar coater or a slit coater, followed by natural drying. As a result, a coated polarizer in which the lyotropic liquid crystal compound molecules are aligned in one certain direction can be formed as the third polarizer 13. The lyotropic liquid crystal compound forms a supramolecular association which is liquid crystalline in a solution. Casting a liquid crystalline coating liquid containing the supramolecular association under shear stress aligns the major axis direction of the supramolecular association with the casting direction. In order to improve the coatability and alignment properties, an alignment film may be provided as a base layer by a known method on the transparent substrate before coating, or the transparent substrate before coating may be subjected to hydrophilization.

The lyotropic liquid crystals may be replaced by guest host liquid crystals. Specifically, a liquid crystal composition is obtained by mixing a photopolymerizable liquid crystal compound (liquid crystal compound having a polymerizable functional group capable of being polymerized by photoirradiation) as a host material and a dichroic dye as a guest material in an appropriate solvent. A transparent substrate with an alignment film, which serves as a base layer, is coated with the liquid crystal composition to a certain uniform thickness with a known coating device such as a spin coater or a slit coater. The solvent is then volatilized by heat-drying. The photopolymerizable liquid crystal compound is polymerized by ultraviolet light irradiation, and the alignment of the photopolymerizable liquid crystal compound molecules is fixed. This enables formation of a coated polarizer in which the photopolymerizable liquid crystal compound molecules are aligned in a certain direction as the third polarizer 13.

On the outermost surface of the transparent substrate on which the coated polarizer is formed is provided an alignment film as the first or second alignment film by a known method, in addition to the alignment film as the base layer.

The coated polarizer described above is advantageous in that it does not decrease the sensitivity of the touch panel and is highly compatible with the in-cell liquid crystal panel because it is not conductive and therefore does not serve as an electromagnetic shield. In other words, the coated polarizer is particularly suitable when the second substrate 30 has a touch panel (TP) function.

However, such coated polarizers typically do not have sufficient heat resistance as they contain organic matter. Formation of TFT circuits, which are formed at a temperature higher than 400° C., and color filters, which are formed at a temperature higher than 200° C., on such coated polarizers is therefore not suitable.

Thus, still more preferably, the third polarizer (in-cell polarizer) 13 is formed on only one of the substrates by fabricating TFT circuits and color filters on the other of the substrates by the color filter on array (COA) technique and forming a coated polarizer on the above one substrate which is a bare transparent substrate. In this case, the glass left on one side of the TFT substrate may interfere with achieving a perfect light-shielding effect. Still, the thickness of the two glass substrates between the paired polarizers can be reduced to the thickness of one glass substrate, which optically halves the thickness of the glass. Also, the level of light leakage is proportional to the fourth power of the thickness of a glass substrate and the light leakage can be reduced to $(1/2)^4=1/16$, so that a sufficiently large effect can be achieved.

In addition, the contrast ratio of a coated polarizer (Co=about 50) is not necessarily higher than that of a common polarizer (contrast ratio Co=1000). The coated polarizer is therefore used to function as an auxiliary polarizer for the polarizers 11 and 12 on the outer surfaces (remote from the liquid crystal layer 40) of the glass substrates 21 and 31. The desired contrast ratio (Co=1000) is achieved by the two outside polarizers 11 and 12. This structure achieves a sufficient contrast ratio in a region without light leakage, and the third polarizer 13 serving as an auxiliary polarizer reduces light leakage in a region with light leakage.

More preferably, the thickness of the transparent substrate (preferably, the glass substrate 31) in the TFT substrate (here, the second substrate 30) is made 0.2 mm or less, while the thickness of the transparent substrate (preferably, the glass substrate 21) in the first substrate 20 on which the third polarizer 13 is provided is made 0.4 mm or more. This structure can minimize the thickness of the transparent substrates between the second polarizer 12 and the third polarizer 13 without reducing the overall thickness of the two transparent substrates. Also, the thickness of the transparent substrate on the viewing surface side can be set large, so that both sufficient reduction of light leakage and a certain level of the surface strength (glass strength) of the liquid crystal panel 2 can be achieved.

The transparent substrate having a thickness of 0.4 mm or more may be arranged on the back surface side but is more preferably arranged on the viewing surface side in terms of achieving a certain level of strength. In other words, more preferably, the transparent substrate having a thickness of 0.4 mm or more is arranged on the viewing surface side and the transparent substrate having a thickness of 0.2 mm or less is arranged on the back surface side.

The effect described above does not depend on the direction in which the liquid crystal panel 2 is curved when seen by the viewer, i.e., whether the curved shape is concave or convex (whether the panel is curved concavely or convexly toward the viewer).

Figure 5:
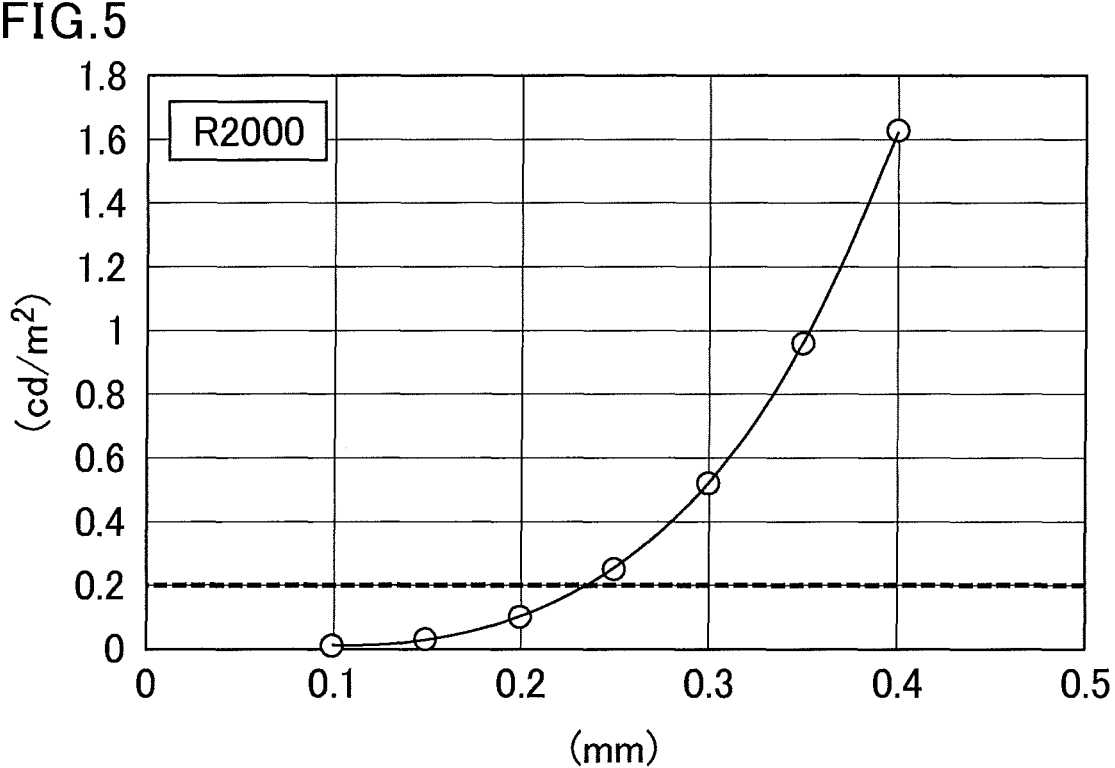
FIG. 5 is a graph of the thickness of glass of the TFT substrate (second substrate) versus the amount of light leakage when each substrate is curved with R=2000 mmφ in Embodiment 1.
Figure 6:
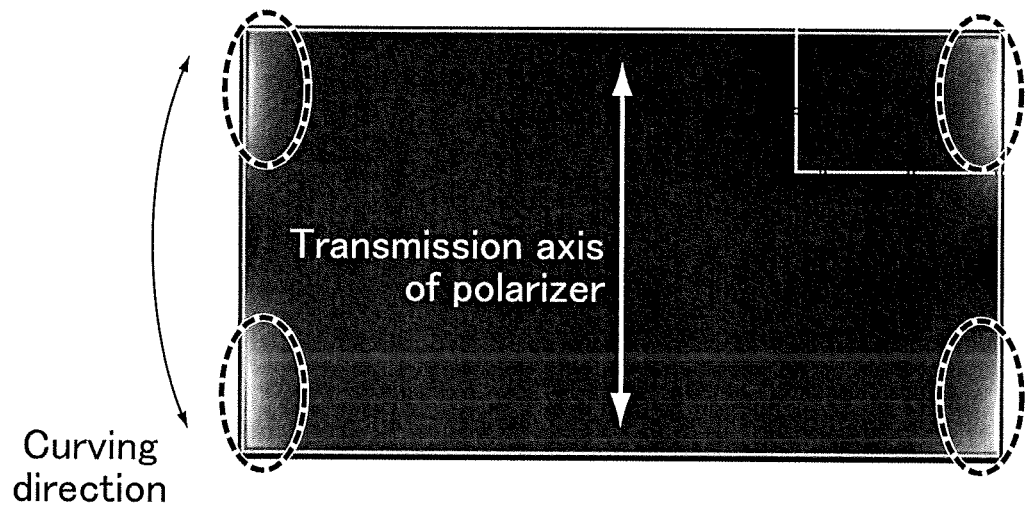
FIG. 6 is a photograph of a black image displayed full screen in a curved display device according to a comparative example, showing an example of light leakage.
Figure 7:
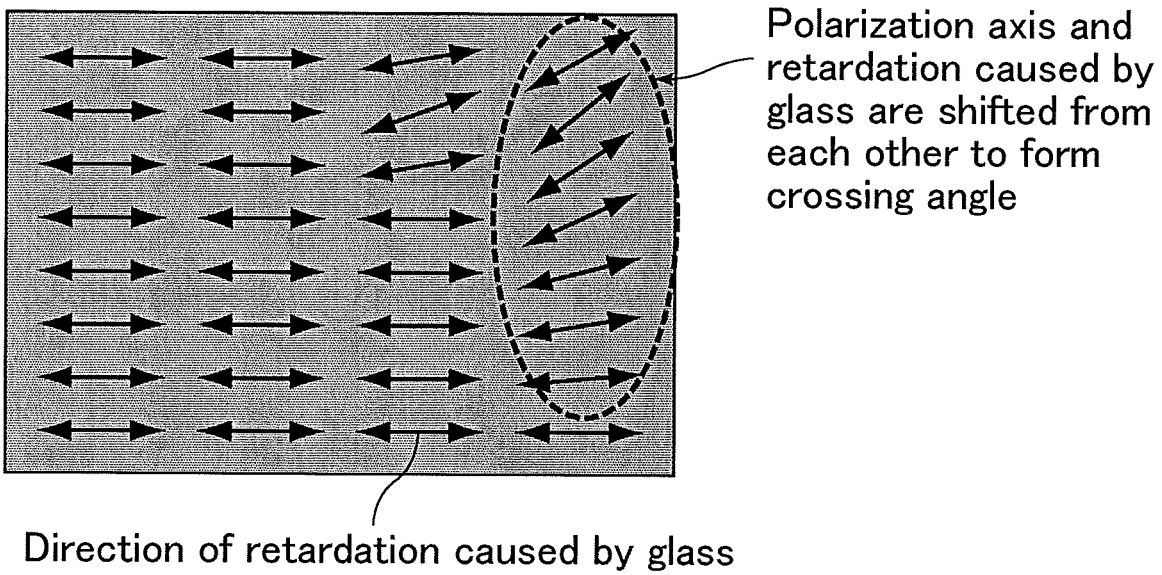
FIG. 7 is a schematic view showing the direction of retardation caused by the glass substrates near the corner surrounded by the white line in FIG. 6.
Figure 8:
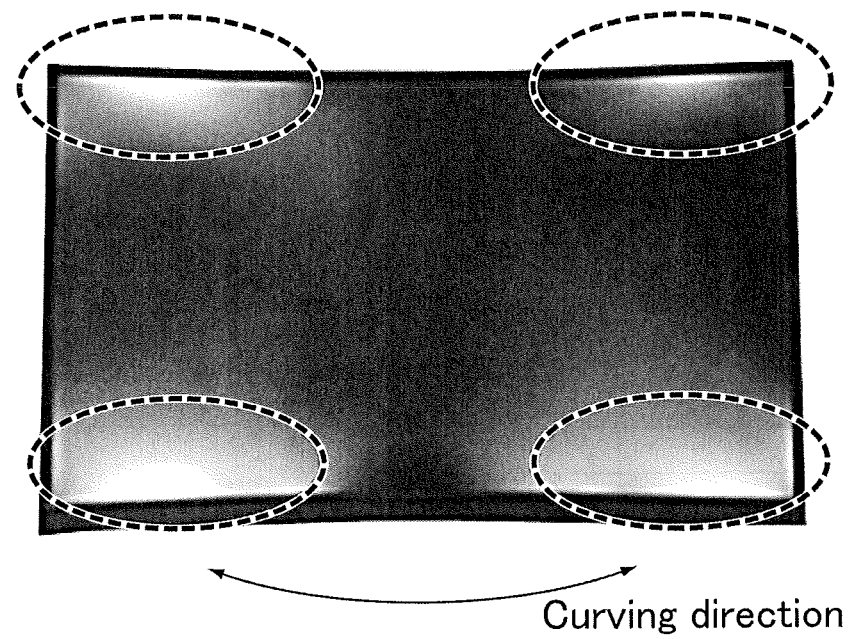
FIG. 8 is a photograph of a black image displayed full screen in a curved display device according to another comparative example, showing an example of light leakage.
Figure 9:
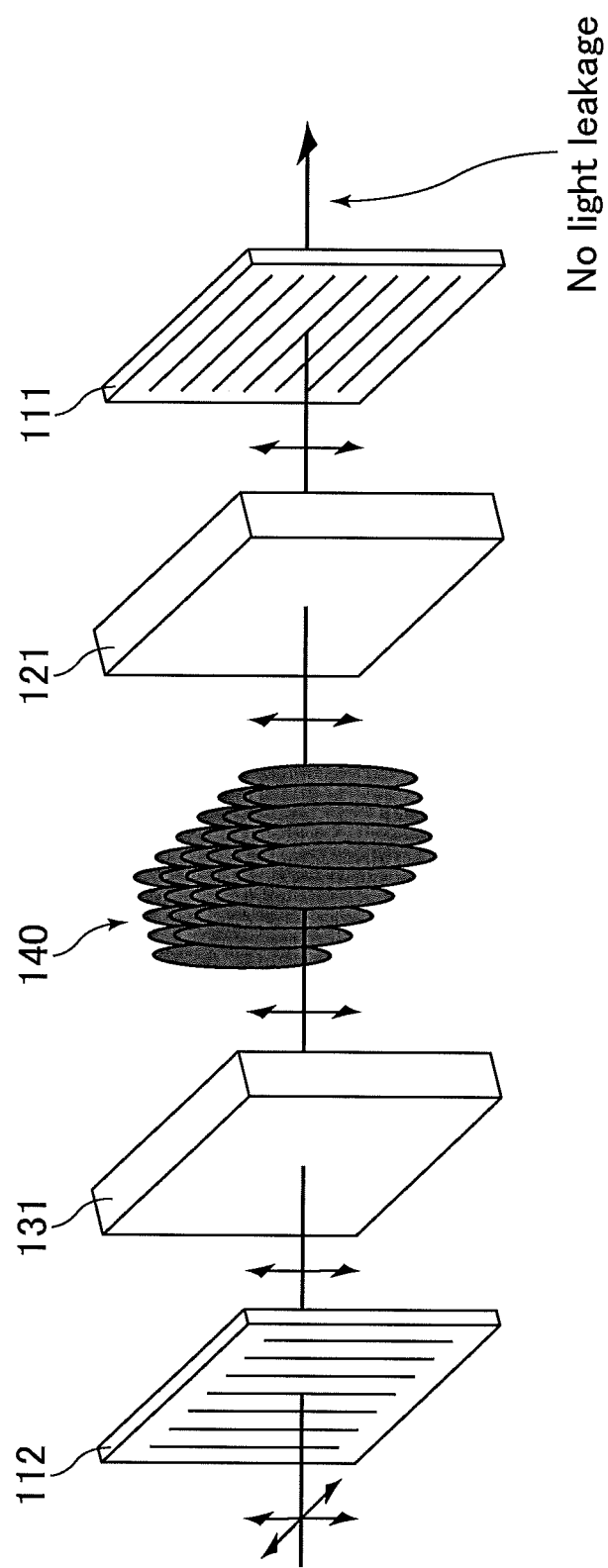
FIG. 9 is a schematic exploded perspective view of a display device according to a comparative embodiment including a flat liquid crystal panel, showing the polarization states of light in the display device.

FIG. 5 is a graph of the thickness of glass of the TFT substrate (the second substrate 30) versus the amount of light leakage ((brightness of portion with light leakage)−(brightness of portion without light leakage)) when each substrate is curved with R=2000 mmφ. The light can be viewed as light leakage when the brightness of light leakage is, though varying from person to person, more than 0.2 cd/m². As shown in FIG. 5, the thickness of the glass of the TFT substrate needs to be 0.2 mm or less in order to maintain the brightness of the leaked light to 0.2 cd/m² or lower. The brightness here means the luminance.

The following Table 1 shows the results of a drop test of a 20-g iron ball measured by varying the thickness of the glass substrate 21 on which the third polarizer 13 is formed in the first substrate 20, with the thickness of the glass substrate 31 in the TFT substrate (the second substrate 30) being fixed to 0.2 mm, when each substrate is curved with R=2000 mmφ. The results show that when the thickness of the glass substrate 21 on the viewing surface side is 0.4 mm or more, a strength to withstand dropping of a 20-g iron ball from a height of 50 cm can be achieved. The glass substrate presumably will not be broken when something not sharp hits the glass substrate in daily use as long as the glass substrate has a strength to withstand dropping of a 20-g iron ball.

TABLE 1

| Height of dropping | Thickness of substrate (mm) | | | | | |
|---|---|---|---|---|---|---|
| (cm) | 0.2 | 0.3 | 0.4 | 0.5 | 0.6 | 0.7 |
| 10 | Broken | Unbroken | Unbroken | Unbroken | Unbroken | Unbroken |
| 30 | Broken | Broken | Unbroken | Unbroken | Unbroken | Unbroken |
| 50 | Broken | Broken | Unbroken | Unbroken | Unbroken | Unbroken |

The results show that both sufficient reduction of light leakage and a certain level of the glass strength can be achieved when the thickness of glass of the TFT substrate (the second substrate 30) is set to 0.2 mm or less and the thickness of glass of the first substrate 20 with the third polarizer 13 is set to 0.4 mm or more.

As described above, the present embodiment relates to a curved display device including a liquid crystal panel in a normally black mode. The liquid crystal panel includes, in addition to the first polarizer 11 and the second polarizer 12 respectively provided on the viewing surface side and the back surface side of the liquid crystal cell 10, the third polarizer 13 on the surface of the glass substrate 21 closer to the liquid crystal layer 40 in the first substrate 20 on the viewing surface side, which is one of the first substrate 20 and the second substrate 30 of the liquid crystal cell 10. The third polarizer 13 can block the polarized light rays orthogonal to the transmission axis of the second polarizer 12 included in the light significantly polarized through the liquid crystal layer 40 (for example, IPS liquid crystal layer). The polarized light rays slightly leaking from the third polarizer 13 can also be blocked by the first polarizer 11 on the viewing surface side. This structure can therefore reduce local light leakage.

More specifically, when linearly polarized light emitted from the backlight 3 and passed through the second polarizer 12 passes through the curved glass substrate 31, the light is converted to elliptically polarized light near the four corners of the panel 2 due to retardation caused by curving the glass substrate 31. The oscillating direction of the elliptically polarized light is more greatly shifted from the transmission axis direction of the second polarizer 12 as the light passes through the liquid crystal layer 40, and then incident on the first substrate 20. The polarized light rays oscillating in the direction orthogonal to the transmission axis of the second polarizer 12 in the elliptically polarized light are blocked by the third polarizer 13 provided on the surface of the glass substrate 21 closer to the liquid crystal layer 40. Only some of the rays of the elliptically polarized light are therefore converted to linearly polarized light and incident on the glass substrate 21. The linearly polarized light incident on the glass substrate 21 is converted to elliptically polarized light again when it passes through the curved glass substrate 21, but most rays of the light are blocked by the first polarizer 11. This can prevent or reduce local light leakage.

Also, since the present embodiment utilizes the first polarizer 11 and the second polarizer 12, a certain contrast ratio can be achieved for the entire liquid crystal panel 2. This allows use of a coated polarizing layer whose contrast ratio is not necessarily higher than a common polarizer as the third polarizer 13, enabling easy implementation of the present embodiment.

The third polarizer 13 may be provided on the surface of the glass substrate 31 closer to the liquid crystal layer 40 in the second substrate 30 which is one of the first substrate 20 and the second substrate 30. In this case, the polarized light rays orthogonal to the transmission axis of the second polarizer 12 can be blocked by the third polarizer 13 before the light is greatly polarized through the liquid crystal layer 40 (for example, IPS liquid crystal layer), and the polarized light rays slightly leaked from the third polarizer 13 can also be blocked by the first polarizer 11 on the viewing surface side. This can reduce local light leakage.

More specifically, when linearly polarized light emitted from the backlight 3 and passed through the second polarizer 12 passes through the curved glass substrate 31, the light is converted to elliptically polarized light near the four corners of the panel 2 due to retardation caused by the glass substrate 31. The polarized light rays orthogonal to the transmission axis of the second polarizer 12 included in in the elliptically polarized light are blocked by the third polarizer 13 provided on the surface of the glass substrate 31 closer to the liquid crystal layer 40. The elliptically polarized light is thus converted to linearly polarized light and travels through the liquid crystal layer 40 parallelly to the liquid crystal molecules. The linearly polarized light incident on the first substrate 20 is converted to elliptically polarized light when it passes through the curved glass substrate 21, but most rays of the light are blocked by the first polarizer 11. This can reduce local light leakage.

As described above, preferably, the third polarizer 13 is provided on only one of the first substrate 20 and the second substrate 30. This allows use of a coated polarizer, which is inexpensive and easy to produce, as the third polarizer 13 on one of the first substrate 20 and the second substrate 30 which is not a TFT substrate.

From the same point of view, one of the first substrate 20 and the second substrate 30 on which the third polarizer 13 is not provided is preferably a thin-film transistor substrate including color filters. Such a structure also allows production of a coated polarizer, which lacks heat resistance, as the third polarizer 13 by avoiding the influence of high-temperature processes such as color filter formation and thin-film transistor formation. Also, since the color filters are provided on the TFT substrate, the TFTs and the color filters are not shifted from each other when the liquid crystal panel 2 is curved, so that color shift can be prevented.

Preferably, the transparent substrate in one of the first substrate 20 and the second substrate 30 on which the third polarizer 13 is provided (i.e., one of the glass substrate 21 and the glass substrate 31) has a thickness of 0.4 mm or more, while the transparent substrate in the other of the first substrate 20 and the second substrate 30 on which the third polarizer 13 is not provided (i.e., the other of the glass substrate 21 and the glass substrate 31) has a thickness of 0.2 mm or less. This can lead to a very small total thickness of the transparent substrate (glass substrate 21 or 31) which may cause retardation when curved and which is provided between the third polarizer 13 and the first polarizer 11 or between the third polarizing layer 13 and the second polarizer 12. Thereby, both reduction of light leakage near the four corners of the panel 2 and a certain level of panel thickness can be simultaneously achieved.

The third polarizer 13 preferably contains lyotropic liquid crystals. Thereby, a coated polarizer can be easily formed as the third polarizer 13.

The third polarizer 13 may contain guest host liquid crystals. Also in this case, a coated polarizer can be easily formed as the third polarizer 13.

A coated polarizer containing these liquid crystal materials do not have electromagnetic shielding property, and is therefore highly compatible with the in-cell liquid crystal panel having a touch panel (TP) function on the TFT substrate.

Hereinabove, although the case has been described where the second substrate 30 on the back surface side is a TFT substrate with the color filter layer 33, the first substrate 20 on the viewing surface side may be a TFT substrate with the color filter layer 33.

Also, the third polarizer 13 may be provided on the surface of each of the transparent substrates (glass substrates 21 and 31) closer to the liquid crystal layer 40 respectively provided in the first substrate 20 and the second substrate 30. This structure can prevent or reduce local light leakage as with the case described above. Here, the third polarizer 13 is provided also in the TFT substrate. The third polarizer 13 can be produced in the TFT substrate by the following method. Specifically, after the color filter layer 33 and the flattening film 57 are formed, a coated polarizer is formed by a coating method. Then, contact holes penetrating through the coated polarizer are formed in the photolithography step. Then, the common electrode 58 and the pixel electrodes 60 are formed using ZnO electrodes or silver thin-film electrodes which can be formed at a temperature as low as about 100° C.

REFERENCE SIGNS LIST

1: curved display device
2: liquid crystal panel
3: backlight
10: liquid crystal cell
11: first polarizer
12: second polarizer
13: third polarizer
20: first substrate
21: glass substrate (transparent substrate)
30: second substrate
31: glass substrate (transparent substrate)
32: TFT layer
33: color filter layer
40: liquid crystal layer
50: gate electrode
51: gate insulator
52: thin-film semiconductor
53: source electrode
54: drain electrode
55: first interlayer insulating film
56: color filter
57: flattening film
58: common electrode
59: second interlayer insulating film
60: pixel electrode
61: contact hole

What is claimed is:

1. A curved display device comprising a liquid crystal panel in a normally black mode,
the liquid crystal panel comprising a first polarizer, a liquid crystal cell, and a second polarizer in a stated order from a viewing surface side,
the liquid crystal cell comprising a first substrate including a first transparent substrate, a liquid crystal layer, and a second substrate including a second transparent substrate in a stated order from the viewing surface side,
the first substrate being provided with a third polarizer on a surface of the first transparent substrate closer to the liquid crystal layer and a first alignment film on a surface of the third polarizer closer to the liquid crystal layer,
the second substrate being provided with a TFT layer on a surface of the second transparent substrate closer to the liquid crystal layer, a color filter layer on a surface of the TFT layer closer to the liquid crystal layer, an electrode layer on a surface of the color filter layer closer to the liquid crystal layer, and a second alignment film on a surface of the electrode layer closer to the liquid crystal layer,
the liquid crystal layer including liquid crystal molecules,
the liquid crystal molecules in the liquid crystal layer being horizontally aligned in a predetermined direction parallel to a transmission axis of the first polarizer or the second polarizer by the control force of the first and second alignment films with no voltage applied to the liquid crystal layer, and
the third polarizer being a coated polarizer,
wherein a transmission axis of the third polarizer is parallel to the transmission axis of the first polarizer.

2. The curved display device according to claim 1, wherein the first transparent substrate has a thickness of 0.4 mm or more, and
the second transparent substrate has a thickness of 0.2 mm or less.

3. The curved display device according to claim 1, wherein the third polarizer contains lyotropic liquid crystals.

4. The curved display device according to claim 1, wherein the third polarizer contains guest host liquid crystals.

5. A curved display device comprising a liquid crystal panel in a normally black mode,
the liquid crystal panel comprising a first polarizer, a liquid crystal cell, and a second polarizer in a stated order from a viewing surface side,
the liquid crystal cell comprising a first substrate including a first transparent substrate, a liquid crystal layer, and a second substrate including a second transparent substrate in a stated order from the viewing surface side,
the first substrate being provided with a third polarizer on a surface of the first transparent substrate closer to the liquid crystal layer and a first alignment film on a surface of the third polarizer closer to the liquid crystal layer,
the second substrate being provided with a TFT layer on a surface of the second transparent substrate closer to the liquid crystal layer, a color filter layer on a surface of the TFT layer closer to the liquid crystal layer, an electrode layer on a surface of the color filter layer closer to the liquid crystal layer, and a second alignment film on a surface of the electrode layer closer to the liquid crystal layer,
the liquid crystal layer including liquid crystal molecules,
the liquid crystal molecules in the liquid crystal layer being horizontally aligned in a predetermined direction parallel to a transmission axis of the first polarizer or the second polarizer by the control force of the first and second alignment films with no voltage applied to the liquid crystal layer, and the third polarizer being a coated polarizer, wherein a transmission axis of the third polarizer is parallel to the transmission axis of the second polarizer.

6. The curved display device according to claim 5, wherein the first transparent substrate has a thickness of 0.4 mm or more, and the second transparent substrate has a thickness of 0.2 mm or less.

7. The curved display device according to claim 5, wherein the third polarizer contains lyotropic liquid crystals.

8. The curved display device according to claim 5, wherein the third polarizer contains guest host liquid crystals.

\* \* \* \* \*